(12) United States Patent
Jiang

(10) Patent No.: US 11,443,562 B2
(45) Date of Patent: Sep. 13, 2022

(54) BLUETOOTH COMMUNICATION TIMING DEVICE FOR SPEED CUBE

(71) Applicant: GUANGZHOU GANYUAN INTELLIGENT TECHNOLOGY CO., LTD., Guangzhou (CN)

(72) Inventor: Ganyuan Jiang, Guangzhou (CN)

(73) Assignee: GUANGZHOU GANYUAN INIELLIGENT TECHNOLOGY CO., LTD., Guangzhou (CN)

( * ) Notice: Subject to any disclaimer, the term of this patent is extended or adjusted under 35 U.S.C. 154(b) by 0 days.

(21) Appl. No.: 17/237,009

(22) Filed: Apr. 21, 2021

(65) Prior Publication Data
US 2021/0335058 A1    Oct. 28, 2021

(30) Foreign Application Priority Data

Apr. 22, 2020  (CN) .......................... 202020618740.2

(51) Int. Cl.
*G07C 1/24*    (2006.01)
*G04G 21/04*   (2013.01)
*H04W 4/80*    (2018.01)

(52) U.S. Cl.
CPC ............... *G07C 1/24* (2013.01); *G04G 21/04* (2013.01); *H04W 4/80* (2018.02)

(58) Field of Classification Search
CPC ........... G07C 1/24; H04W 4/80; G04G 21/04; G06F 1/1626; G06F 1/1698; G06F 1/1635; G06F 1/1675; G06F 1/1658; G06F 1/16; G06F 1/1613; G06F 1/1633; G06F 1/1615; G06F 1/1656; H01Q 1/243; H01Q 1/273; H01Q 7/00; H01Q 1/24; H04B 5/0087; H04B 1/38; H04B 15/04; H05K 1/0218; H05K 1/00; H05K 1/0213; H05K 1/0216; H05K 1/0219; H05K 1/0224; H05K 1/18
See application file for complete search history.

(56) References Cited

U.S. PATENT DOCUMENTS

| | | | |
|---|---|---|---|
| 2006/0101685 A1* | 5/2006 | Smith, III | G09F 21/049 40/556 |
| 2006/0216679 A1* | 9/2006 | Matsoff | G09B 17/00 434/178 |
| 2008/0016266 A1* | 1/2008 | Liu | G06F 3/0607 710/311 |

(Continued)

FOREIGN PATENT DOCUMENTS

CN        109758368 A  *  5/2019

*Primary Examiner* — Hai Phan
*Assistant Examiner* — Anthony D Afrifa-Kyei

(57) ABSTRACT

The present invention provides a magic cube timing device based on Bluetooth communication, including a timer main body and a non-slip mat. The timer main body is fastened to the non-slip mat. The timer main body includes a main body housing, a main control PCB board, a display apparatus, and two magnetic surface stickers. Two through holes are disposed in the main body housing. One end of the magnetic surface sticker penetrates through the through hole to connect to the main control PCB board. According to the magic cube timing device based on Bluetooth communication in the present invention, each use result in the magic cube timing device is transmitted to an external terminal by using a Bluetooth module, to effectively collect statistics on and store timing data.

8 Claims, 4 Drawing Sheets

(56) References Cited

U.S. PATENT DOCUMENTS

2013/0095921 A1\* 4/2013 Shikata ............... A63F 13/5258
        463/31
2016/0234356 A1\* 8/2016 Thomas ................ H04K 3/84
2020/0100692 A1\* 4/2020 Cotton ................ A61B 5/6898

\* cited by examiner

BLUETOOTH COMMUNICATION TIMING DEVICE FOR SPEED CUBE

TECHNICAL FIELD

The present invention relates to the field of timing, and in particular, to a magic cube timing device based on Bluetooth communication.

BACKGROUND

In a magic cube exercise phase, magic cube enthusiasts usually use timers as exercise props, to simulate competition scenes to exercise solving speeds, and collect statistics to improve results. A timer device is usually used as a competition prop in a magic cube solving competition. During the competition, contestants need to rotate a magic cube quickly to complete reordering of the magic cube in the shortest time. As a result determining basis, accuracy and stability of the timer are critical. Existing magic cube timers can hold only limited data and cannot transmit data to external devices in a timely and efficient manner.

SUMMARY

To overcome the disadvantages of the prior art, an objective of the present invention is to provide a magic cube timing device based on Bluetooth communication, to resolve the problem that existing magic cube timers can hold only limited data and cannot transmit data to external terminal devices in a timely and efficient manner.

The objective of the present invention is achieved by using the following technical solutions:

A magic cube timing device based on Bluetooth communication is provided, including a timer main body and a non-slip mat, where the timer main body is fastened to the non-slip mat, the timer main body includes a main body housing, a main control PCB board, a display apparatus, and two magnetic surface stickers, both the display apparatus and the magnetic surface sticker are mounted on an outer surface of the main body housing, the magnetic surface stickers are located on two sides of the display apparatus, the main control PCB board is mounted inside the main body housing, two through holes are disposed in the main body housing, one end of the magnetic surface sticker penetrates through the through hole to connect to the main control PCB board, a Bluetooth module is disposed on the main control PCB board, the Bluetooth module is connected to an external terminal, two battery apparatuses are disposed inside the main body housing, the battery apparatuses are connected to the main control PCB board, and the two battery apparatuses are center-symmetric with the center point of the main body housing as the center of symmetry.

Further, the main body housing includes a main body surface housing and a main body bottom housing, the main body bottom housing is fastened to the non-slip mat, the main body bottom housing is snapped to the main body surface housing, and both the display apparatus and the magnetic surface sticker are mounted on the main body surface housing.

Further, the main body surface housing is an open surface housing, a conductive optical fiber is fixedly mounted at an opening of the main body surface housing, a light guide PCB board is disposed inside the main body surface housing, and the light guide PCB board is connected to both the battery apparatus and the conductive optical fiber.

Further, a conductive optical fiber pressure plate is further disposed inside the main body surface housing, and the conductive optical fiber pressure plate is in contact with the conductive optical fiber.

Further, the display apparatus includes a display screen and a button, the button is located on one side of the display screen, the display screen includes an LCD screen and a zebra-strip conductive adhesive, the zebra-strip conductive adhesive is connected to both the LCD screen and the main control PCB board, and the button is connected to the main control PCB board.

Compared with the prior art, the present invention has the following beneficial effects: This application provides the magic cube timing device based on Bluetooth communication, including the timer main body and the non-slip mat. The timer main body is fastened to the non-slip mat. The timer main body includes the main body housing, the main control PCB board, the display apparatus, and the two magnetic surface stickers. Both the display apparatus and the magnetic surface sticker are mounted on the outer surface of the main body housing. The magnetic surface stickers are located on the two sides of the display apparatus. The main control PCB board is mounted inside the main body housing. The two through holes are disposed in the main body housing. One end of the magnetic surface sticker penetrates through the through hole to connect to the main control PCB board. The Bluetooth module is disposed on the main control PCB board. The Bluetooth module can be connected to the external terminal. The two battery apparatuses are disposed inside the main body housing. The battery apparatuses are connected to the main control PCB board. The two battery apparatuses are center-symmetric with the center point of the main body housing as the center of symmetry. Each use result in the magic cube timing device is transmitted to the external terminal by using the Bluetooth module, and a real-time synchronization function is implemented, to effectively collect statistics on and store timing data.

The foregoing descriptions are merely an overview of the technical solutions of the present invention. In order that the technical means of the present invention can be clearly understood and carried out based on the content of the specification, the following describes the present invention in detail by using preferred embodiments of the present invention in combination with the accompanying drawings. Specific implementations of the present invention are given in detail in the following embodiments and accompanying drawings thereof.

BRIEF DESCRIPTION OF DRAWINGS

The accompanying drawings described herein are intended to provide a further understanding of the present invention and constitute a part of this application, and the illustrative embodiments of the present invention and the descriptions thereof are intended to explain the present invention and do not constitute improper limitations on the present invention. In the accompanying drawings.

Figure 1:
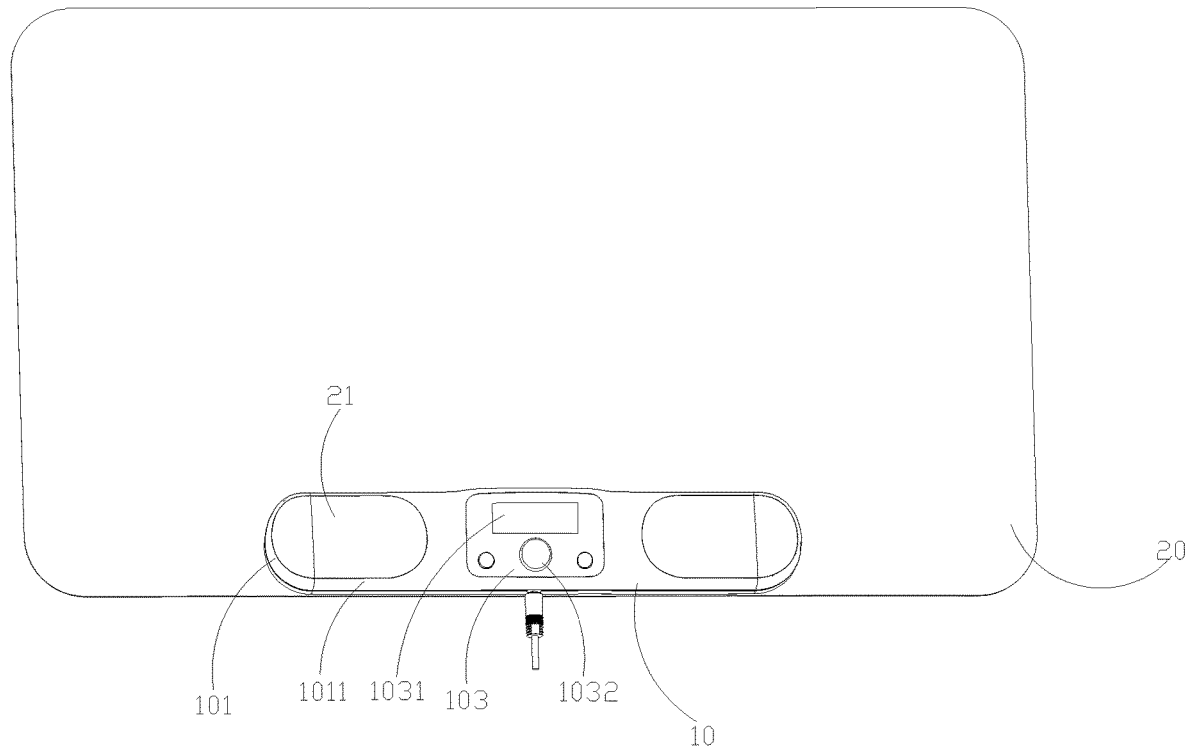
FIG. 1 is a schematic structural view of a magic cube timing device based on Bluetooth communication according to the present invention.
Figure 2:
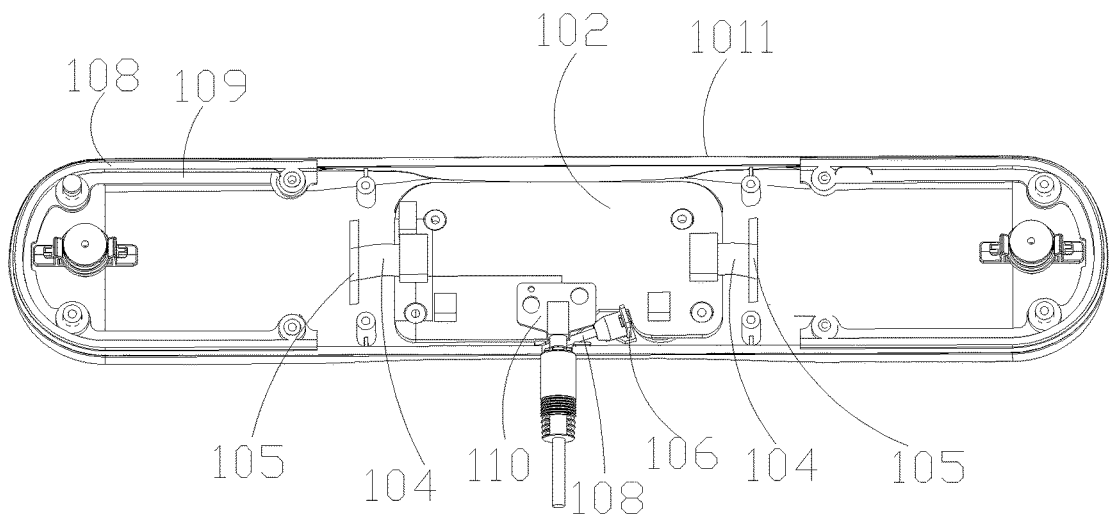
FIG. 2 is a schematic structural view of a magic cube timing device based on Bluetooth communication excluding a main body bottom housing according to the present invention.
Figure 3:
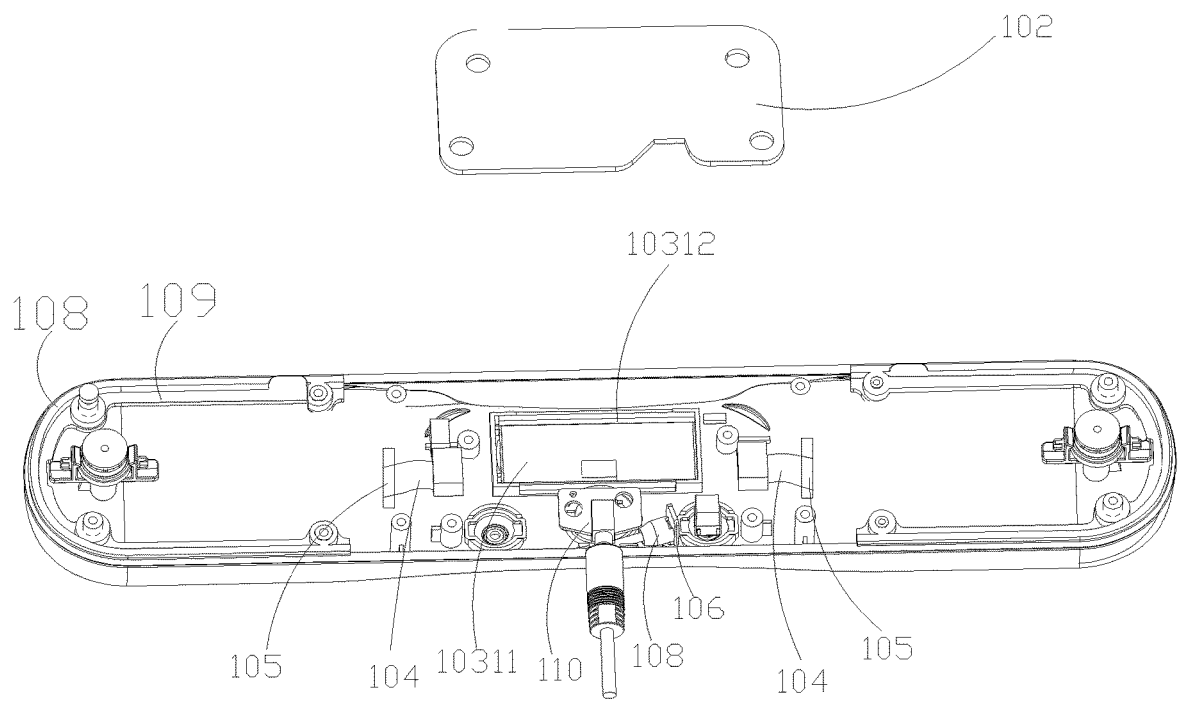
FIG. 3 is a schematic view of a partially exploded structure of a magic cube timing device based on Bluetooth communication excluding a main body bottom housing according to the present invention.
Figure 4:
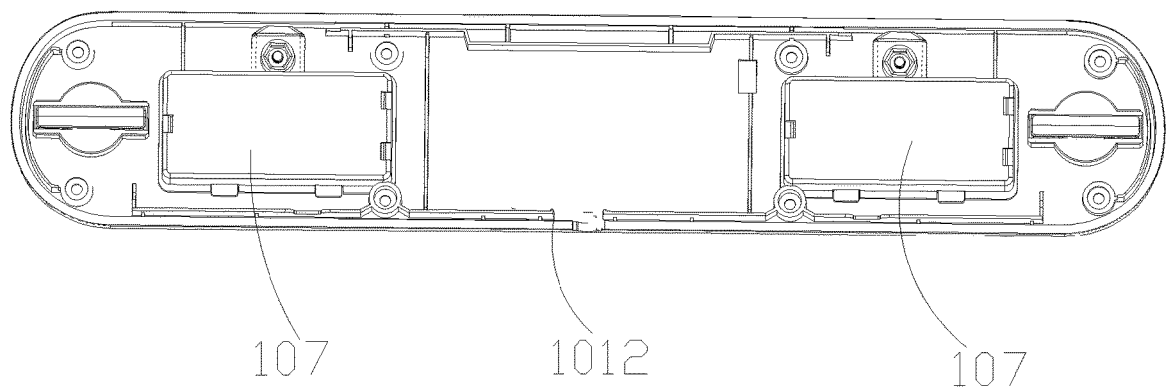
FIG. 4 is a schematic view of a front structure of a main body bottom housing in a magic cube timing device based on Bluetooth communication according to the present invention.
Figure 5:
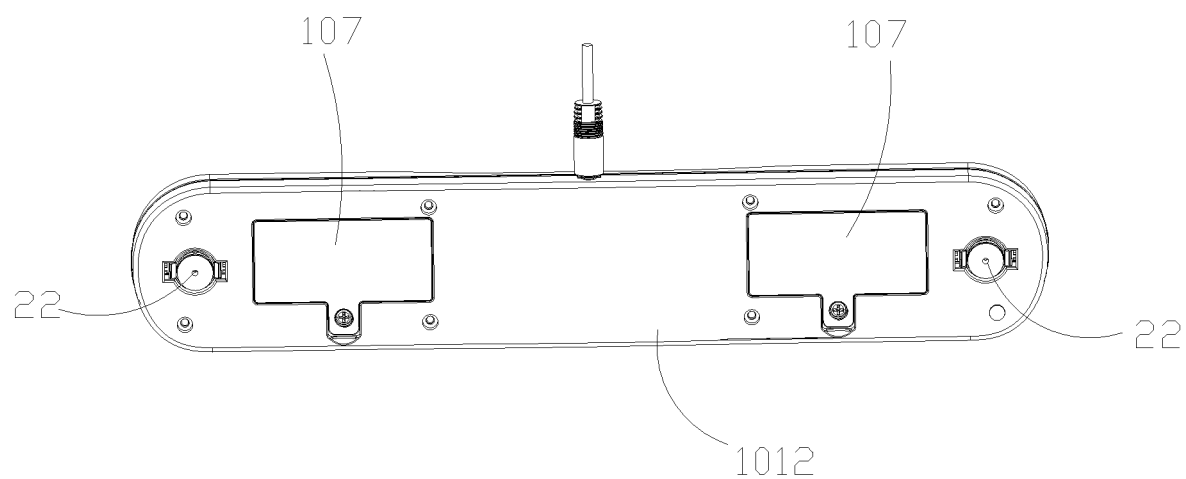
FIG. 5 is a schematic view of a back structure of a main body bottom housing in a magic cube timing device based on Bluetooth communication according to the present invention.

In the figures: 10. Timer main body; 101. Main body housing; 1011. Main body surface housing; 1012. Main body bottom housing; 102. Main control PCB board; 103. Display apparatus; 1031. Display screen; 10311. LCD screen; 10312. Zebra-strip conductive adhesive; 1032. Button; 1033. Start button; 104. Magnetic surface sticker; 105. Through hole; 106. Light guide PCB board; 107. Battery apparatus; 108. Conductive optical fiber; 109. Conductive optical fiber pressure plate; 110. Connection cable socket component; 20. Non-slip mat; 21. Color surface sticker; 22. Elastic rubber buckle; and 30. Lanyard.

DESCRIPTION OF EMBODIMENTS

The following further describes the present invention with reference to the accompanying drawings and specific implementations. It should be noted that the following described embodiments or technical features may be randomly combined to form new embodiments provided that there is no conflict.

As shown in FIG. 1 to FIG. 5, this application provides a magic cube timing device based on Bluetooth communication, including a timer main body 10 and a non-slip mat 20. The timer main body 10 is fastened to the non-slip mat 20. Specifically, the timer main body 10 is detachably fastened to the non-slip mat 20, and the timer main body 10 and the non-slip mat 20 are fastened together by using an elastic rubber buckle 22. The timer main body 10 includes a main body housing 101, a main control PCB board 102, a display apparatus 103, and two magnetic surface stickers 104. Both the display apparatus 103 and the magnetic surface sticker 104 are mounted on an outer surface of the main body housing 101. The magnetic surface stickers 104 are located on two sides of the display apparatus 103. The main control PCB board 102 is mounted inside the main body housing 101. Two through holes 105 are disposed in the main body housing 101. One end of the magnetic surface sticker 104 penetrates through the through hole 105 to connect to the main control PCB board 102. A Bluetooth module is disposed on the main control PCB board 102. The Bluetooth module is connected to an external terminal. Two battery apparatuses 107 are disposed inside the main body housing 101. The battery apparatuses 107 are connected to the main control PCB board 102. The two battery apparatuses 107 are center-symmetric with the center point of the main body housing 101 as the center of symmetry. Specifically, the battery apparatuses 107 are fastened to a main body bottom housing. In this embodiment, the main body housing 101 includes a main body surface housing 1011 and a main body bottom housing 1012. The main body bottom housing 1012 is fastened to the non-slip mat 20. The main body bottom housing 1012 is snapped to the main body surface housing 1011. Both the display apparatus 103 and the magnetic surface sticker 104 are mounted on the main body surface housing 1011. The main body surface housing 1011 is an open surface housing. A conductive optical fiber 108 is fixedly mounted at an opening of the main body surface housing 1011. A light guide PCB board 106 is disposed inside the main body surface housing 1011. The light guide PCB board 106 is connected to both the battery apparatus 107 and the conductive optical fiber 108. A conductive optical fiber pressure plate 109 is further disposed inside the main body surface housing 1011, and the conductive optical fiber pressure plate 109 is in contact with the conductive optical fiber.

In addition, the display apparatus 103 includes a display screen 1031 and a button 1032. The button 1032 is located on one side of the display screen 1031. The display screen 1031 includes an LCD screen 10311 and a zebra-strip conductive adhesive 10312. The zebra-strip conductive adhesive 10312 is connected to both the LCD screen 10311 and the main control PCB board 102. The button 1032 is connected to the main control PCB board 102. In this embodiment, there are three buttons 1032, including a power switch button, a reset switch button, and a toggle switch button. In this embodiment, the magnetic surface sticker 104 on the main body surface housing 1011 is covered with a color surface sticker 21, to increase the aesthetics of the magic cube timing device. In addition, a connection cable socket component 110 is further disposed inside the main body housing 101. The connection cable socket component 110 is connected to the main control PCB board 102. An adapted connection cable is inserted into the connection cable socket component 110 to externally connect the device to a large display device.

In a working process, the two battery apparatuses 107 supply power to the entire device, the display screen 1031 is used to display time, and the main control PCB board 102 stores time obtained after each time of timing and sends the time to the external terminal in real time by using the Bluetooth module. In this embodiment, the external terminal is a mobile phone terminal or a tablet computer terminal. In this embodiment, the dual-battery apparatus 107 is designed to improve battery life of the entire magic cube timing device, so that the endurance time is longer, and the magic cube timing device is portable to meet various use scenarios. In this embodiment, the main body housing is an arc-shaped structure, and the conductive optical fiber 108 is used as ambient light, to improve use experience.

This application provides the magic cube timing device based on Bluetooth communication, including the timer main body and the non-slip mat. The timer main body is fastened to the non-slip mat. The timer main body includes the main body housing, the main control PCB board, the display apparatus, and the two magnetic surface stickers. Both the display apparatus and the magnetic surface sticker are mounted on the outer surface of the main body housing. The magnetic surface stickers are located on the two sides of the display apparatus. The main control PCB board is mounted inside the main body housing. The two through holes are disposed in the main body housing. One end of the magnetic surface sticker penetrates through the through hole to connect to the main control PCB board. The Bluetooth module is disposed on the main control PCB board. The Bluetooth module is connected to the external terminal. The two battery apparatuses are disposed inside the main body housing. The battery apparatuses are connected to the main control PCB board. The two battery apparatuses are center-symmetric with the center point of the main body housing as the center of symmetry. In this embodiment, each use result in the magic cube timing device is transmitted to the external terminal by using the Bluetooth module, to effectively collect statistics on and store timing data.

Figure 6:
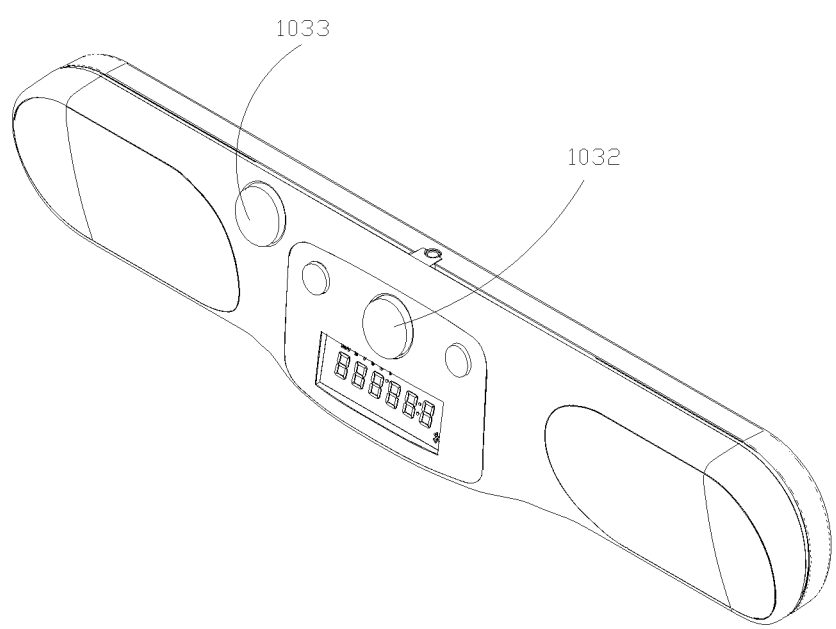
FIG. 6 is a schematic structural view in which a start button is mounted on a main body housing in a magic cube timing device based on Bluetooth communication according to the present invention.

To perform timing in single-person training, referring to FIG. 6, a start button 1033 is disposed on the main body housing 101. The start button 1033 may be a mechanical button shown in FIG. 6, or may be an optoelectronic switch. The start button 1033 is connected to the main control PCB board, and starts a monitoring function of the main control PCB board when in use. Before the magic cube is rotated, one corner of the magic cube is caused to touch the start button 1033, so that timing of the main control PCB board is started when the magic cube touches the start button 1033.

To perform timing in single-person training, an ultrasonic transceiver module may be alternatively disposed on the main body housing. The ultrasonic transceiver module is connected to the main control PCB board. The ultrasonic transceiver module continuously sends ultrasonic waves to the magic cube and receives reflected ultrasonic waves. A reflected ultrasonic signal changes when the magic cube is rotated, so that the main control PCB board starts timing when the ultrasonic transceiver module detects the rotation of the magic cube.

To perform timing in single-person training, a camera may be alternatively disposed on the main body housing. The camera is connected to the main control PCB board. The camera continuously take pictures of the magic cube and a human hand, so that the main control PCB board starts timing when the camera captures rotation of the magic cube.

Figure 7:
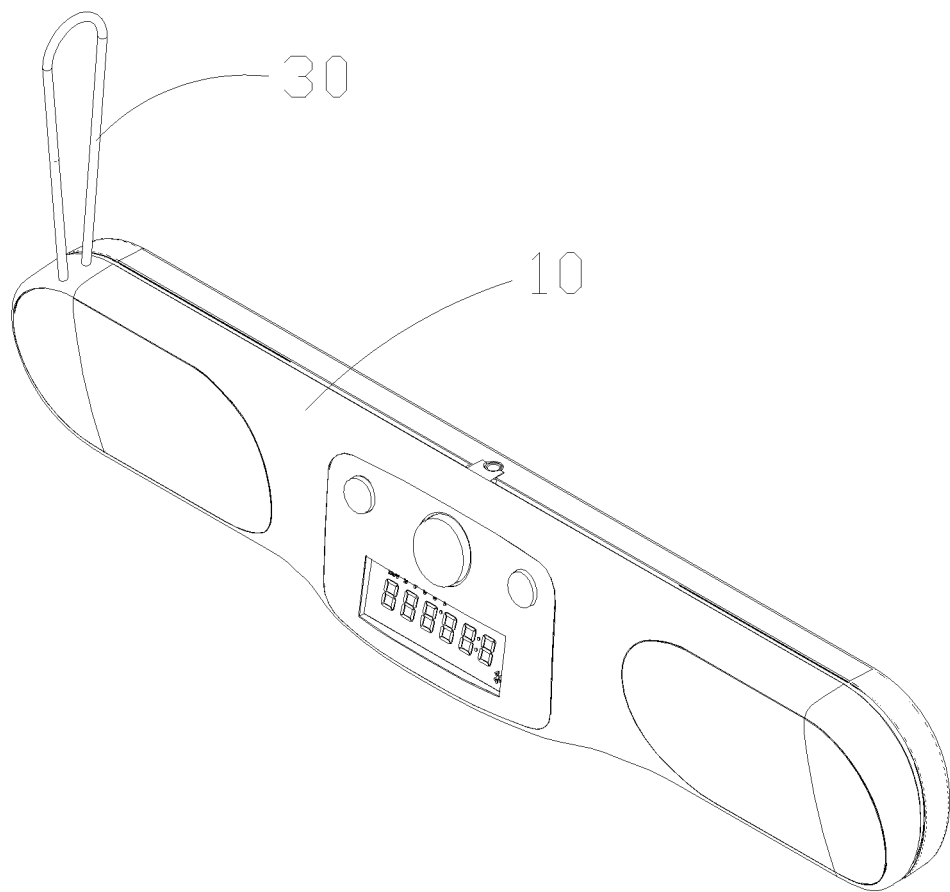
FIG. 7 is a schematic structural view in which a lanyard is mounted on a main body housing in a magic cube timing device based on Bluetooth communication according to the present invention.

To record only rotation time of the magic cube, referring to FIG. 7, a lanyard 30 wearable around a wrist is disposed on the main body housing 101, and an acceleration sensor (not shown) connected to the main control PCB board is further disposed inside the main body housing 101. The lanyard 30 is worn around a wrist of a user when in use, so that when the wrist rotates the magic cube, the main control PCB board senses the rotation by using the acceleration sensor and performs timing, and stops timing when the magic cube is at rest. In this way, total rotation time of the magic cube is recorded, without recording rest or suspension time, so that the shortest time that the user can reach can be accurately predicted.

The foregoing descriptions are merely preferred embodiments of the present invention, and do not constitute limitations on the present invention in any form. Any person of ordinary skill in the industry can smoothly implement the present invention based on the accompanying drawings and the foregoing descriptions in the specification. However, any slightly changed, modified, and evolved equivalent changes made by a person skilled in the art by using the technical content disclosed above without departing from the scope of the technical solutions of the present invention are equivalent embodiments of the present invention. In addition, any change, modification, and evolution of any equivalent change made to the foregoing embodiments based on the essential technology of the present invention shall still fall within the protection scope of the technical solutions of the present invention.

What is claimed is:

1. A magic cube timing device based on Bluetooth communication, comprising a timer main body and a non-slip mat, wherein the timer main body is fastened to the non-slip mat, the timer main body comprises a main body housing, a main control PCB board, a display apparatus, and two magnetic surface stickers, both the display apparatus and the magnetic surface sticker are mounted on an outer surface of the main body housing, the magnetic surface stickers are located on two sides of the display apparatus, the main control PCB board is mounted inside the main body housing, two through holes are disposed in the main body housing, one end of the magnetic surface sticker penetrates through the through hole to connect to the main control PCB board, a Bluetooth module is disposed on the main control PCB board, the Bluetooth module is connected to an external terminal, two battery apparatuses are disposed inside the main body housing, the battery apparatuses are connected to the main control PCB board, and the two battery apparatuses are center-symmetric with the center point of the main body housing as the center of symmetry, wherein the main body housing comprises a main body surface housing and a main body bottom housing, the main body bottom housing is fastened to the non-slip mat, the main body bottom housing is snapped to the main body surface housing, and both the display apparatus and the magnetic surface sticker are mounted on the main body surface housing, wherein the main body surface housing is an open surface housing, a conductive optical fiber is fixedly mounted at an opening of the main body surface housing, a light guide PCB board is disposed inside the main body surface housing, and the light guide PCB board is connected to both the battery apparatus and the conductive optical fiber.

2. The magic cube timing device based on Bluetooth communication according to claim 1, wherein a conductive optical fiber pressure plate is further disposed inside the main body surface housing, and the conductive optical fiber pressure plate is in contact with the conductive optical fiber.

3. The magic cube timing device based on Bluetooth communication according to claim 1, wherein the display apparatus comprises a display screen and a button, the button is located on one side of the display screen, the display screen comprises an LCD screen and a zebra-strip conductive adhesive, the zebra-strip conductive adhesive is connected to both the LCD screen and the main control PCB board, and the button is connected to the main control PCB board.

4. The magic cube timing device based on Bluetooth communication according to claim 1, wherein a connection cable socket component is further disposed at the opening of the main body surface housing and inside the main body housing, the connection cable socket component is connected to the main control PCB board, and an adapted connection cable is inserted into the connection cable socket component to externally connect the device to a large display device.

5. The magic cube timing device based on Bluetooth communication according to claim 1, wherein a start button is disposed on the main body housing, and the start button is connected to the main control PCB board, so that timing of the main control PCB board is started when the magic cube touches the start button.

6. The magic cube timing device based on Bluetooth communication according to claim 1, wherein an ultrasonic transceiver module is disposed on the main body housing, and the ultrasonic transceiver module is connected to the main control PCB board, so that the main control PCB board starts timing when the ultrasonic transceiver module detects rotation of the magic cube.

7. The magic cube timing device based on Bluetooth communication according to claim 1, wherein a camera is disposed on the main body housing, and the camera is connected to the main control PCB board, so that the main control PCB board starts timing when the camera captures rotation of the magic cube.

8. The magic cube timing device based on Bluetooth communication according to claim 1, wherein a lanyard wearable around a wrist is disposed on the main body housing, and an acceleration sensor connected to the main control PCB board is further disposed inside the main body housing, so that when the wrist rotates the magic cube, the main control PCB board senses the rotation by using the acceleration sensor and performs timing.

* * * * *